Nov. 8, 1960    R. B. MATTHEWS    2,959,713
CIRCUIT CONTROLLING DEVICE
Filed Nov. 21, 1955
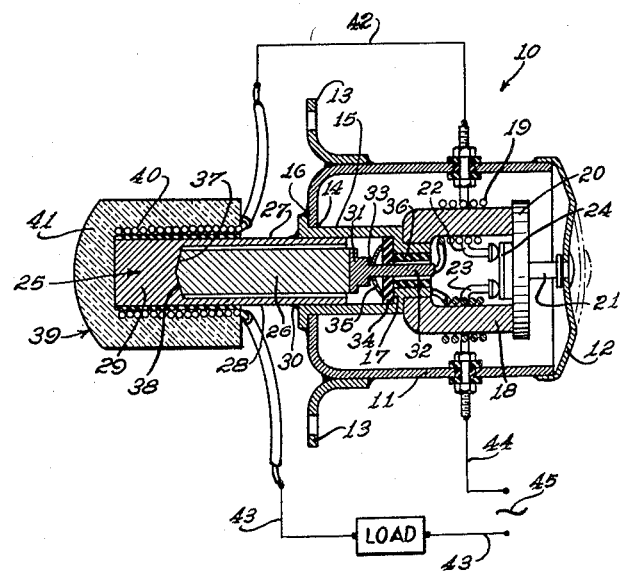
INVENTOR.
*Russell B. Matthews*
BY
*Seegert & Schwalbach*
*Att'ys*

United States Patent Office 2,959,713
Patented Nov. 8, 1960

2,959,713

CIRCUIT CONTROLLING DEVICE

Russell B. Matthews, Wauwatosa, Wis., assignor, by mesne assignments, to Minnesota Mining and Manufacturing Company, St. Paul, Minn., a corporation of Delaware Filed Nov. 21, 1955, Ser. No. 547,927

3 Claims. (Cl. 317—40)

This invention relates to improvements in circuit controlling device, and more particularly to devices of this character which are responsive to a predetermined overload in a given circuit.

In order to prevent expensive damage to certain electrical equipment, it is desirable to provide overload protection which is operable, on occurrence of a predetermined overload, to interrupt the circuit to said equipment. Protective devices of this character are desirably of the manually resettable type so that the cause of the overload condition may be rectified before electric power is again supplied to the equipment.

It is a general object of the present invention to provide a circuit controlling device of novel construction utilizing a resettable electroresponsive operator and a thermoelectric generator, there being means responsive to a predetermined overload in a given circuit for changing the temperature of a thermo-junction of said generator sufficiently to effect generation of thermoelectric energy of a magnitude to which said operator is responsive.

Another object of the invention is to provide an improved circuit controlling device of the class described wherein the thermoelectric generator includes at least one semi-metallic element.

Another object of the invention is to provide an improved circuit controlling device of the aforementioned character wherein the generator, operator, and temperature changing means is embodied in a unitary assemblage for simultaneous mounting.

Still another object of the invention is to provide an improved circuit controlling device as aforementioned wherein the electroresponsive operator is enclosed within an enclosure and has a control member movable between operating and released positions, said enclosure having a flexible resilient wall portion operatively connected to the control member to bias the latter toward released position, depression of said resilient wall portion effecting resetting of the control member to its operative position against said bias.

A more specific object of the invention is to provide a device of the class described wherein the electroresponsive operator comprises a permanent magnet adapted to hold the control member in operating position by magnetic attraction, there being a depolarizing coil for said magnet connected in circuit with the thermoelectric generator so that on generation of a predetermined thermoelectric current by the generator, the permanent magnet is depolarized sufficiently to release the control member for movement to its released position under the bias of the resilient wall portion of the enclosure.

Other and further objects of the invention will become apparent as the description proceeds, reference being had to the accompanying drawing illustrating one complete embodiment of the invention, wherein the single figure is a longitudinal sectional view of the improved circuit controlling device schematically shown connected into a load circuit.

Referring more particularly to the drawing, the numeral 10 indicates one form of the improved circuit controlling device, which in the illustrated embodiment comprises a composite manually resettable relay or circuit breaker, thermoelectric generator and heater. The device 10 comprises a cup-shaped metallic casing 11 having a flexible resilient end wall member 12 peripherally sealed thereto, as by soldering or brazing. The casing 11 is also provided with brackets 13 for mounting the unitary assembly, and the end wall opposite the member 12 is apertured at 14 to receive a tubular member 15 which is sealingly fixed thereto, as by brazing or silver soldering at 16.

The tubular member 15 has a reduced diameter inner end portion forming an annular shoulder 17, and mounted, for example by a press fit, on said inner end portion is a permanent magnet 18 of generally U-shaped cross-section, the latter being apertured to receive said inner end portion as shown. A depolarizing winding 19 is wound about the legs of the permanent magnet 18, and an armature 20 is cooperable with said magnet and movable to attracted and retracted positions with respect to the pole faces thereof. A stem 21 connected the armature 20 with a central portion of the resilient wall member 12 as shown, and said wall member acting through said stem, biases the armature 20 away from the pole faces of the magnet 18. The unstressed configuration of the resilient wall member 12 is shown in dot and dash lines in the drawing, and depression of the central portion of said member to the position shown effects movement of the armature 20 into engagement with the pole faces of the magnet 18. The magnetic attraction of the permanent magnet 18 for the armature 20 is normally sufficient to hold the latter in engagement with the pole faces of said magnet against the bias of the resilient wall member 12.

Sealingly and insulatably mounted in suitable apertures in the casing 11 are a pair of low resistance contacts 22 and 23. The armature 20 insulatably carries a low resistance contact bridging member 24 which completes the circuit between the contacts 22 and 23 when the armature 20 is in engagement with the pole faces of the magnet 18 as shown. On predetermined energization of the winding 19, the permanent magnet 18 is effectively depolarized to the point where the bias of the wall member 12 overcomes the force of magnetic attraction between the magnet 18 and the armature 20, whereupon said wall member moves the armature to retracted position and the contact bridging member 24 to disengaged position with respect to the contacts 22 and 23.

The improved circuit controlling device includes a thermoelectric generator 25 for supplying the depolarizing winding 19 with energizing current as will hereinafter appear. The generator 25 illustrated, comprises a pair of thermocouple element means 26 and 27, the latter of which takes the form of an elongated generally cup-shaped sheath member, preferably of stainless steel. The sheath 27 has a tubular sleeve portion 28 and an outer end portion 29. The opposite end of the member 27 is telescopically received within the tubular member 15, which may be of brass or other suitable material, and is sealingly fixed therein, as by silver soldering or brazing at 30. The casing 11, wall member 12, tubular member 15, and sheath member 27 may comprise an hermetically sealed enclosure protecting the contacts and the thermocouple element means 26 from exposure to the atmosphere.

The thermocouple element means 26 preferably comprises a rod-like or cylindrical ingot of semi-metallic alloy or composition disposed in coaxial spaced relation within the sheath 27. Because the thermocouple element means 26 is of frangible material, the generator 25 is constructed in a manner to provide shock-resistant mounting means 26 is of frangible material, the generator 25 is con-contact electrode 31 having a stem portion 32 formed with a shoulder 33. Surrounding the contact electrode stem portion 32 and engaging the inner annular shoulder 17 is an insulating washer 34. Interposed between the insulating washer 34 and the stem shoulder 33 is a compression spring 35 which may take the form of a concavo-convex centrally apertured resilient disc also surrounding the electrode stem 32. A tube 36 of insulating material lines the reduced diameter inner end portion of the tubular member 15 and insulates the contact electrode stem 32 therefrom. As shown in the drawing, one end of the depolarizing winding 19 is connected in circuit with the contact electrode stem 32, and the other end of said winding is connected in circuit with the tubular member 15.

The spring 35 exerts compressive stresses on the element 26, which stresses substantially reduce the net tensile stresses to which said element is subjected during transverse acceleration or shock, said compressive stresses not being so high as to exceed the compressive strength of said element. The compressive stress under which the member 26 is placed increases the magnitude of deformation which said element can withstand without fracture, and affords the generator 25 substantial shock resistance.

The thermocouple element 26 may, for example, be formed of a semi-metallic alloy or composition which may be characterized as a binary metallic compound of slightly imperfect composition, i.e. containing beneficial impurities constituting departures from perfect stoichiometry by reason of an excess of one of the metals over the other, and/or containing added beneficial impurity substances hereinafter referred as to "promoters." Such semi-metallic compositions have semi-conductor like conductance, both electrical and thermal, and include mixtures of such binary metallic compounds which may be denominated ternary metallic alloys or compositions. Certain of these alloys or compositions exhibit negative and certain exhibit positive electrical characteristics. More specifically the thermocouple element 26 may, for example, be formed of an alloy further described in Robert W. Fritts and Sebastian Karrer Patent No. 2,811,571, issued October 28, 1957.

Electrical contact with the ingot 26 is made at one end by bonding the end surface 37 of said ingot to the inner surface 38 of the end portion 29 of the sheath 27. The electrical contact with the ingot 26 at the opposite end is made by bonding the contact electrode 31 with the adjacent end surface of the ingot 26. In each case, the interface at the bond must have a mechanical strength at least comparable to that of the alloy of which the element 26 is made. The stainless steel sheath 27 and the contact electrode 31 must be chemically stable with respect to the element 26 and provide the necessary means for connecting said element into its electrical circuit while at the same time chemically isolating said element from the other conductors making up the circuit. Iron is especially adapted for use as contact electrode material for elements 26 of lead-tellurium-selenium composition, and pressure type contacts of carbon are suitable for elements 26 of any of the aforedescribed compositions including those comprising lead and sulphur.

The radiation responsible for the removal of heat transmitted across the thermo-junction at the surfaces 37 and 38 when the adjacent portions of the sheath 27 is heated takes place between the element 26 and the contact electrode 31 on the one hand, and metal walls of element 27, and tubular member 15 on the other. The temperature of the thermo-junction of the electrode 31 under such circumstances is dependent upon the temperature of its environment, and it is therefore desirable to keep the ambient temperature at said thermo-junction low. To this end, the tube 15 and the casing 11 afford means for conducting heat from the sheath 27 to a cooler zone and provides a heat sink which aids in cooling the casing around said thermo-junction.

Means is provided for changing the temperature of the thermo-junction at the surfaces 37 and 38, said means comprising a sub-assembly 39 including a helical heater coil 40 of electrical resistance material extending around the outer end portion of the sheath 27 as shown. The coil 40 is surrounded by a generally cup-shaped insulator 41 which also surrounds the outer end of the sheath 27 as shown. One end of the heater coil 40 is connected in circuit with the contact 22, as by a conductor 42, and the other end of said coil is connected into a load circuit, as by a conductor 43. The contact 23 is connected into the load circuit, as by a conductor 44, so that the contacts 22 and 23 and the heater coil 40 are connected in series circuit relation in the load circuit, the latter being powered from a suitable source, for example an alternating current source 45.

In the operation of the illustrated circuit controlling device, the parts are normally in the operative position shown, and the winding 40 carries the normal operating load current of the load circuit without generating substantial amounts of heat. When, however, a predetermined overload occurs in the load circuit, this overload causes the coil 40 to generate heat, and after a predetermined time lag, the temperature of the thermo-junction at the surfaces 37 and 38 is raised to such an extent that the temperature differential between it and the thermo-junction at the contact electrode 31 causes the generator 25 to generate thermoelectric energy of a magnitude to energize the coil 19 for depolarization of the magnet 18 and release of the armature 20 under the bias of the spring 42. This, of course, interrupts the circuit between the contacts 22 and 23 and thereby interrupts the load circuit to avoid the dangerous condition and also to terminate the generation of heat by the coil 40.

The time lag between the occurrence of the overload and the interruption of the load circuit at the contacts 22 and 23 varies inversely with the degree of the overload on the load circuit, i.e. the greater the overload, the quicker the coil 40 raises the temperature of the thermo-junction at the surfaces 37 and 38 to the level effecting generation of a drop-out current.

The load circuit remains interrupted and the improved circuit controlling device cannot be effectively reset until after the temperature differential between the thermo-junctions has been reduced, for example by cooling of the thermo-junction at the surfaces 37 and 38, to the point where insufficient current is supplied to the coil 19 to depolarize the magnet 18 and prevent the latter from holding the armature 20 in engagement therewith when reset. As aforementioned, resetting of the improved device is accomplished by depression of the central portion of the wall member 12, to thereby move the armature 20 into engagement with the pole faces of the magnet 18 while at the same time moving the contact bridging member 24 into engagement with the contacts 22 and 23.

Having thus described one embodiment of the invention, it is to be understood that the illustrated form was selected to facilitate the disclosure of the invention, rather than to limit the number of forms which it may assume. Various modifications, adaptations and alterations may be applied to the specific form shown to meet the requirements of practice without in any manner departing from the spirit or scope of the present invention, and all of such modifications, adaptations and alterations are contemplated as may come within the scope of the appended claims.

What is claimed as the invention is:

1. A circuit overload cutout comprising a thermoelectric generator having at least two thermojunctions, a resettable control device having a control member movable to operating and released positions, means biasing said control member toward released position, electroresponsive means normally operable to hold said control member in operating position when moved thereto against said bias and operable to release said control member for movement toward released position under the bias of said biasing means upon predetermined energization thereof, said electroresponsive holding means being directly connected in circuit with said generator for energization thereby whenever said generator is generating thermoelectric energy, electroresponsive means in heat transfer relation with at least one of said thermojunctions and adapted for connection to a load circuit separate from the load therein and responsive to a predetermined overload in said circuit to create a temperature differential between said thermojunctions effective to cause generation of thermoelectric energy of a magnitude to effect release of said electroresponsive holding means and movement of said control member toward released position under the bias of said biasing means, and circuit controlling contacts operatively related to said control member for movement therewith from circuit making to circuit interrupting position upon movement of said control member from said operating toward said released position, said contacts being adapted for connection into said load circuit to afford interruption of said circuit by movement of said contacts to circuit interrupting position in response to an overload condition in said load circuit.

2. A circuit overload cutout comprising a thermoelectric generator having at least two thermojunctions, a resettable control device having a control member movable to operating and released positions, means biasing said control member toward released position, electroresponsive holding means comprising permanent magnet means normally operable to hold said control member in operating position when moved thereto against said bias and having coil means associated with said permanent magnet means operable to release said control member for movement toward released position under the bias of said biasing means upon predetermined energization thereof, said coil means being directly connected in circuit with said generator for energization thereby whenever said generator is generating thermoelectric energy, electroresponsive means in heat transfer relation with at least one of said thermojunctions and adapted for connection to a load circuit separate from the load therein and responsive to a predetermined overload in said circuit to create a temperature differential between said thermojunctions effective to cause generation of thermoelectric energy of a magnitude to effect release of said control member and movement thereof toward released position under the bias of said biasing means, and circuit controlling contacts operatively related to said control member for movement therewith from circuit making to circuit interrupting position upon movement of said control member from said operating toward said released position, said contacts being adapted for connection into said load circuit to afford interruption of said circuit by movement of said contacts to circuit interrupting position in response to an overload condition in said load circuit.

3. A circuit overload cutout comprising a thermoelectric generator having a thermojunction, a resettable control device having a control member movable to operating and released positions, means biasing said control member toward released position, electroresponsive holding means comprising permanent magnet means normally operable to hold said control member in operating position when moved thereto against said bias and having coil means associated with said permanent magnet means operable to release said control member for movement toward released position under the bias of said biasing means upon predetermined energization thereof, said coil means being directly connected in circuit with said generator for energization thereby whenever said generator is generating thermoelectric energy, an electrical resistance heater in heat transfer relation with said thermojunction and adapted for connection to a load circuit separate from the load therein and responsive to a predetermined overload in said circuit to heat said thermojunction sufficiently to cause generation of thermoelectric energy of a magnitude to effect release of said electroresponsive control member and movement thereof toward released position under the bias of said biasing means, and circuit controlling contacts operatively related to said control member for movement therewith from circuit making to circuit interrupting position upon movement of said control member from said operating toward said released position, said contacts being adapted for connection into said load circuit to afford interruption of said circuit by movement of said contacts to circuit interrupting position in response to an overload condition in said load circuit.

References Cited in the file of this patent

UNITED STATES PATENTS

| 666,764 | Lindstrom et al. | Jan. 29, 1901 |
| 1,871,875 | Bradford | Aug. 16, 1932 |
| 2,040,919 | Caldwell | May 19, 1936 |
| 2,283,340 | Ray | May 19, 1942 |
| 2,283,697 | Prince | May 19, 1942 |
| 2,286,374 | Ray | June 16, 1942 |
| 2,302,685 | Dyer | Nov. 24, 1942 |
| 2,457,153 | Hubbell | Dec. 28, 1948 |
| 2,486,785 | Hutcheon | Nov. 1, 1949 |
| 2,649,767 | Matthews | Aug. 25, 1953 |

FOREIGN PATENTS

| 63,222 | Switzerland | Feb. 27, 1913 |
| 490,065 | Germany | Jan. 9, 1930 |
| 678,502 | Great Britain | Sept. 3, 1952 |
| 516,987 | Belgium | Feb. 14, 1953 |

UNITED STATES PATENT OFFICE
CERTIFICATE OF CORRECTION

Patent No. 2,959,713            November 8, 1960

Russell B. Matthews

It is hereby certified that error appears in the above numbered patent requiring correction and that the said Letters Patent should read as corrected below.

Column 2, line 22, for "connected" read -- connects --; column 3, line 1, for "means 26 is of frangible material, the generator 25 is con-" read -- means therefor. The element means 26 includes an iron --.

Signed and sealed this 28th day of November 1961.

(SEAL)
Attest:

ERNEST W. SWIDER
Attesting Officer

DAVID L. LADD
Commissioner of Patents
USCOMM-DC